United States Patent [19]

Rudner et al.

[11] 4,052,346

[45] Oct. 4, 1977

[54] FLAME-RETARDANT POLYURETHANE FOAM COMPOSITIONS

[75] Inventors: Bernard Rudner, Ridgewood, N.J.; Peter Daniel Pauly, Mountaintop, Pa.

[73] Assignee: Tenneco Chemicals, Inc., Saddle Brook, N.J.

[21] Appl. No.: 583,329

[22] Filed: June 3, 1975

[51] Int. Cl.² ............................................. C08G 18/14
[52] U.S. Cl. ........................ 260/2.5 AM; 260/2.5 AG; 260/2.5 AH; 260/2.5 AJ; 260/77.5 MA
[58] Field of Search .................. 260/2.5 AG, 2.5 AH, 260/2.5 AM, 2.5 AJ, 77.5 MA

[56] References Cited

U.S. PATENT DOCUMENTS

| | | | |
|---|---|---|---|
| 3,006,870 | 10/1961 | Steinfatt et al. | 260/2.5 BB |
| 3,178,300 | 4/1965 | Gemeinhardt et al. | 260/2.5 AG |
| 3,644,238 | 2/1972 | Smith | 260/2.5 BB |
| 3,748,288 | 7/1973 | Winkler et al. | 260/2.5 AG |
| 3,884,848 | 5/1975 | Ricciardi et al. | 260/2.5 AG |

FOREIGN PATENT DOCUMENTS

| | | | |
|---|---|---|---|
| 1,063,605 | 3/1967 | United Kingdom | 260/2.5 AJ |

*Primary Examiner*—Eugene C. Rzucidlo
*Attorney, Agent, or Firm*—James P. Scullin

[57] ABSTRACT

Flexible, substantially nonlustrous, open-celled polyurethane foam made by an in situ process is rendered permanently flame-retardant by the incorporation of tribromoneopentyl alcohol into the reaction mixture.

12 Claims, No Drawings

FLAME-RETARDANT POLYURETHANE FOAM COMPOSITIONS

BACKGROUND OF THE INVENTION

1. Field of the Invention

The present invention pertains to flexible cellular polyurethane foam compositions which are permanently flame-retardant, and to methods for the preparation thereof. More particularly, the present invention relates to the preparation of essentially open-celled, or reticulated, flexible, cellular, permanently flame-retardant, polyurethane foam compositions by an in situ one-step process, utilizing tribromoneopentyl alcohol as the flame-retardant.

2. Prior Art

It is known in the art to make flame-retardant polyurethane foams by various means, and although some degree of commercial success has been attained, none of the known materials is entirely satisfactory. In addition to the shortcomings of the known methods and products, new uses for polyurethane foams are being continually developed, in some of which flame retardancy is a required property. Further, due to increased public awareness of the dangers from fire inherent in many common materials (including, but by no means limited to, polyurethane foams) used as components of clothing, furniture, buildings, vehicles, packing materials, electrical appliances, and so on, stricter regulations, controls, and specifications are constantly being imposed with respect to polyurethane foams used in older and well-established applications.

The art generally recognizes that rigid polyurethane foams are relatively easier to render flame-retardant than are flexible polyurethane foams, and that reticulated flexible polyurethane foams are particularly difficult to produce with permanent flame-retardancy. Rigid polyurethane foams are generally closed-cell foams, and are thus inherently more flame-retardant than the open-cell flexible polyurethane foams which are the subject of the present invention. In the open-cell foams, every open and interconnecting cell acts as a chimney so that such products burn readily unless treated with a flame-retardant. In addition, the predominantly closed-cell rigid polyurethane foams are generally made with a halogenated hydrocarbon, especially a fluorocarbon, blowing agent which is retained within the cells. This retained halogenated blowing agent imparts some flame-retardancy to the foam. In contrast to this, the open-cell foams contain air within the cell structure, which favors burning unless the foam is treated with a flame-retardant.

The known methods of achieving some degree of flame-retardancy in polyurethane foam compositions include incorporating into the reaction mix prior to foaming such chemicals as antimony oxide, inorganic phosphates, phosphate esters, halogenated phosphate esters, organic phosphonates, halogenated organic phosphonates, halogenated hydrocarbons, elemental phosphorus, and various others. It is also known to impart some degree of flame-retardancy to flexible polyurethane foams by an after-treatment of the cured foam, such as by impregnation or coating with a flame-retardant chemical or chemical composition. Another known means is to utilize, as reactants to forming urethane foams, halogenated polyols as well as polymerized diisocyanates.

The prior art methods for making flame-retardant flexible open-cell polyurethane foams are two-step or three-step processes, entailing making flame-retardant foams and then reticulating them in a separate step; or making foams without a flame retardant, reticulating them in a second step and then rendering them flame-retardant by means of a third, post-treatment step. These multi-step processes increase cost, and do not provide foams which are permanently flame-retardant.

As examples of prior art methods and compositions, the use of halogenated phosphate esters is disclosed in U.S. Pat. No. 3,793,240 and U.S. Pat. No. 3,872,053; the combination of ammonium phosphate and halogenated phosphate esters is disclosed in U.S. Pat. No. 3,795,637; the use of phosphonates is disclosed in U.S. Pat. No. 3,737,397; the use of halogenated hydrocarbon polymers and optionally, chlorinated paraffin is disclosed in U.S. Pat. No. 3,810,851; the use of chlorinated paraffin and antimony oxide is disclosed in U.S. Pat. No. 3,799,897; the use of halogenated aromatic amines is disclosed in U.S. Pat. No. 3,738,947; the use of a combination of monoammonium phosphate and amino-poly-imidazolineamide is disclosed in U.S. Pat. No. 3,803,063; the use of inorganic salts, oxides, and hydroxides is disclosed in U.S. Pat. No. 3,737,400; the use of brominated benzoquinone is disclosed in U.S. Pat. No. 3,725,316; the use of fumaric acid is disclosed in U.S. Pat. No. 3,746,664; the use of combinations of halogenated hydrocarbons, organic or inorganic phosphorus compounds, and "inert" fillers such as antimony oxide is disclosed in U.S. Pat. No. 3,826,762; the use of azodicarbonamide is disclosed in U.S. Pat. No. 3,826,764; the use of phosphonated and halogenated polyether polyols is disclosed in U.S. Pat. No. 3,741,919; the use of U.S. Pat. No. 3,732,265; and U.S. Pat. No. 3,773,696; the use of a combination of polybrominated diols and chlorinated hydrocarbon polymers is disclosed in U.S. Pat. No. 3,738,953; and the use of polymers of tolylene diisocyanate in combination with halogenated aliphatic phosphate esters is disclosed in U.S. Pat. No. 3,803,064.

As previously mentioned, the known methods, especially those claimed to be useful for flexible polyurethane foams, have drawbacks which keep them from being completely satisfactory. Many of the proposed flame-retardant chemicals upset the surface chemistry of the foaming system leading to the formation of coarse cells, uneven distribution of cell size, and even cause collapse of the rising foam. This is particularly so in the manufacture of flexible open-celled foams by in situ processes, these processes requiring a delicate balance of surface-active chemicals to produce open cells without foam collapse.

Additives which are not chemically bound into the urethane polymer are prone to loss during aging and use due to extraction by water and/or organic solvents, by volatilization, and by leaching into other substrates in contact with the cured foam. Some of these known additives act as plasticizers and thus have adverse effects on the physical properties of the foam, such as loss of tensile strength, compression set, and load-bearing capacity. Some are expensive; and some, although effective in increasing flame-retardance, add dead weight to the foam and increase its density. This is an additional economic disadvantage since no increase in foam volume is obtained, and in most cases the foam is sold by volume rather than by weight.

Among the halogenated additives, such as the halogenated phosphate esters, those containing bromine are generally much more effective per unit weight as flame-retardants than those containing chlorine. However, there are off-setting disadvantages; the brominated products are more costly, and in some cases they cause scorch and discoloration of the foam during curing. If chlorinated phosphates are employed to avoid these disadvantages, higher concentrations are needed for a equivalent degree of flame-retardance. This results in some compromise of the cost advantage, and in an increase of some of the undesirable other side effects previously discussed.

Although the known reactive flame-retardants become bound to the urethane polymer and thus are not readily removed by volatilization, extraction, and migration, they also have serious disadvantages, including undesirable effects on polymer structure and hence on physical properties, and on the surface chemistry of cell formation.

The present invention is directed to overcoming the foregoing problems, in the in situ manufacture of flexible reticulated polyurethane foam.

SUMMARY OF THE INVENTION

The present invention provides flexible, resilient, reticulated polyurethane foam which is permanently flame-retardant, i.e. the flame-retarding agent is not readily removed from the foam by extraction, volatilization, or migration. The novel reticulated and permanently flame retardant foam is prepared by an in situ process, not requiring any mechanical or chemical after-treatment to obtain a substantially open-celled product. This one-step process is inherently less costly than the multi-step prior art metods. The foams of this invention are prepared from a reaction mixture comprising an organic polyisocyanate, a polyol or a mixture of polyols, a blowing agent, a hydrophilic organo-silicon foam-stabilizing emulsifier-surfactant designed and adapted for use in the preparation of urethane polymer foam from a polyether polyol and an organic polyisocyanate, a cell opening agent, and a flame-retarding amount of tribromoneopentyl alcohol.

DETAILED DESCRIPTION OF THE INVENTION

U.S. Pat. No. 3,748,288, naming Winkler, Bredbenner, and Adlum as inventors and issued July 24, 1973, discloses an in situ process for preparing substantially non-lustrous open pore polyurethane foam. The disclosure of that patent is hereby incorporated herein by reference. Foams made according to the disclosure of that patent have been found quite suitable for a variety of purposes, but are deficient for some applications due to flammability unless modified by the addition of a flame-retarding additive to the reaction mix. Although some degree of flame-retardance has been achieved through the addition of conventional additives such as tris(2-chloroethyl)phosphate, tris-2-(1,3-dichloropropyl)phosphate, or tris(2,3-dibromopropyl)phosphate, difficulties have been encountered. Extreme care must be exercised during manufacture of the foam to avoid a coarse, uneven, cell structure, total collapse of the foam, and scorching and discoloration of the foam. Even when acceptable foams have been made by careful control of formulation and reaction conditions, flame-retardance of the product is not permanent. Much of the flame-retarding additive is lost during aging and use, due to volatilization, solvent extraction, and so forth.

It has now been found that durable flame-retardance can be readily imparted to such non-lustrous open-celled foams by the incorporation into the reaction mix of a flame retarding amount of tribromoneopentyl alcohol. This additive does not adversely affect the surface chemistry of the foaming reaction, and permits the manufacture of foam having a relatively uniform structure of predominantly open cells. The resulting foam is not scorched nor discolored, and has commercially acceptable tensile, indentation, and load bearing properties. Through modification of the amount of tribromoneopentyl alcohol added, any desired degree of flame-retardance and self-extinguishing properties can be achieved, and flame-retardance is maintained even though the cured foam is subjected to aging or to extraction by organic solvents or hot water.

The discovery that tribromoneopentyl alcohol can be used to prepare permanently flame-retardant reticulated foam by the in situ process without interfering with the cell formation and cell-opening reactions, and without impairment of the physical properties of the cured foam, is quite surprising. It is conventional in the urethane foam art to avoid the use of mono-hydroxy compounds since they are considered to be chain-terminators which lead to the formation of lower molecular weight polymers with fewer cross-links. By way of contrast, such mono-hydroxy compounds are used to some extent in linear urethane polymers, such as those employed in surface coatings, where cross-links are to be avoided and where the mono-hydroxy compounds may serve as molecular weight regulators. In polyurethane foams however, a three-dimensional, cross-linked polymer structure is highly desirable, thus chain terminators are not ordinarily employed. Despite the fact that it would be expected that tribromoneopentyl alcohol would have an adverse effect on polymer structure and physical properties of the foams of the present invention, this is not the case even though the tribromoneopentyl alcohol is bound into the polymer chains and is not readily removed by solvent extraction or other means.

The disclosure of the above-mentioned U.S. Pat. No. 3,748,288 concerns the preparation of flexible, substantially membrane-free polyurethane foams by the reaction of an organic polyisocyanate with: a polyol mixture comprising from 65 to 95 percent by weight of a polyhydric polyester and from 35 to 5 percent by weight of a polyether polyol: water, a hydrophilic organosilicon foam-stabilizing emulsifier surfactant designed and adapted for use in the preparation of urethane polymer foam from a polyether polyol and an organic polyisocyanate; and a hydrophobic, anti-foaming organo-silicon compound. The last-mentioned hydrophobic, anti-foaming organo-silicon compound serves to prevent the formation of, or to destroy, membranes which would otherwise bridge the strands forming the skeletal framework of the foam and would lead to a conventional closed-cell foam. In other words, the hydrophobic organo-silicon compound, illustratively poly(dimethyl siloxane, functions as a cell opener.

In U.S. Pat. No. 3,884,848, naming Ricciardi, Cordora, and Smudin as inventors and issued May 20, 1975 the disclosure of which is also hereby incorporated herein by reference, it is shown that nonlustrous open-celled polyurethane foams can be prepared by a similar in situ process. In this disclosure, the hydrophobic anti-foaming organo-silicon compound is replaced by a cell opener having the formula $(RCOO)_nR'$, wherein R and R' are alkyl or alkenyl groups having from one to 30 carbon atoms, at least one of R and R' having at least 3 carbon atoms, and $n$ being an integer from one to three, with the proviso that when $n$ is one at least one of R and R' has at least eight carbon atoms. Illustrative of the cell openers having the formula $(RCOO)_nR'$ as defined above are stearyl methacrylate, butyl oleate, and trimethylolpropane trimethacrylate. In this disclosure, the polyol reactant used to prepare the polyurethane foam can be a polyether polyol, or a polyester polyol admixed with at least two percent by weight of a polyether polyol.

It has been found that the present invention is also applicable to this in situ process for making reticulated polyether polyurethane foam and polyurethane foam from a ployester polyol in admixture with at least two percent of a polyether polyol, employing as cell opener compounds having the formula $(RCOO)_nR'$ as before defined. The inclusion of tribromoneopentyl alcohol in the reaction mix, in amounts sufficient to impart flame retardancy to the cured foam, enables the manufacture of permanently flame-retardant reticulated foam.

The permanently flame-retardant reticulated foams of the present invention are useful for a variety of purposes, including filters, sound attenuation devices, packing materials, insulation, garment interlinings, rug underlays, mattresses and pillows, cushioning and upholstery, and so on.

Although not limited thereto, the present invention is particularly suitable for the continuous production of flame-retardant reticulated foam in the form of massive bun shaving essentially circular cross-sections or essentially rectangular cross-sections. Round buns so produced can be cut into convenient lengths and then rotated against a blade to peel the foam into a continuous sheet of any desired thickness. Such buns are made having diameters of up to 40 inches or more, the principal limitation on size being that imposed by the size of the apparatus used. Rectangular buns have been made having cross-sections measuring 2 to 5 feet or greater, again limited in size mainly by apparatus limitations, and of any desired length. The rectangular buns can be used as is, cut into thick slabs of lesser dimensions, or sliced into thin sheets of any desired thickness.

The tribromoneopentyl alcohol can be added to the reaction mix by any convenient means. This compound, also known as 3-bromo-2,2-bis (bromomethyl) propan-1-ol, is a solid, with a melting point of about 68°-69° C. Although it can be admixed, in solid form, with the other reaction ingredients, it is preferred to add it to as a liquid, either in molten form or as a solution in a solvent. It is particularly preferred to add it as a solution in a polyether polyol such as a condensate of a triol with propylene oxide. The latter means is especially convenient when producing continuous buns, the solution of the flame-retardant being continuously metered into the mixing head either as a separate stream or as a component of one of the other reactant streams.

The amount of tribromoneopentyl alcohol used is not critical, but depends upon the degree of flame-retardancy desired. It is preferred to use amounts ranging from about 3 to about 30 parts by weight per 100 parts by weight of the total polyol, e.g. the combined weight of polyester polyol and polyether polyol. Lesser amounts may be ineffective and greater amounts may not produce an increase in flame-retardancy commensurate with the increased cost, but lesser or greater amounts can be used if desired without departing from the scope of this invention. A particularly preferred range is from about 10 to about 20 parts by weight per 100 parts by weight of polyol.

In addition to the essential reactants set forth above, any other of the known compounding ingredients for polyurethane foams can be included if desired. These include, but are not restricted to, fillers, pigments, dyes, plasticizers, anti-static agents, anti-microbial agents, anti-oxidants, ultra-violet absorbers, and discoloration inhibitors. Although it is not generally desirable to do so, other conventional flame-retardants such as antimony oxide, zinc borate, or phosphate esters can also be included without departing from the scope of the present invention. Further, the finished and cured foam may be coated or impregnated with any of the conventional flame-retardant compositions known to the art to be useful for special purposes, if desired.

The following are examples of the process and of the product prepared therefrom according to this invention; they are intended to set forth certain preferred embodiments but are not to be taken in any manner as limiting the scope of the invention. In these examples, all parts are parts by weight, and percentages are percentages by weight.

EXAMPLE 1

The following materials were fed to a conventional foaming apparatus to continuously form a round bun of polyurethane foam having a diameter of 40 inches.

| Ingredients | Parts |
| --- | --- |
| Polyester derived from diethylene glycol, trimethylolpropane, and adipic acid: mol. wt. 2000, hydroxyl no. 52 | 85.0 |
| Propoxylated glycerol: mol. wt. 3500, hydroxyl no. 48 | 7.0 |
| Tolylene diisocyanate (80/20)* | 49.4 |
| Ethoxypropoxylated polysiloxane | 3.5 |
| Polydimethylsiloxane (viscosity 50cs) | 0.6 |
| Water | 3.5 |
| Stannous octoate solution, 50% in tricresyl phosphate | 0.2 |
| N-ethylmorpholine | 0.1 |
| Triethylenediamine solution, 33% in dipropylene glycol | 0.25 |
| Brown pigment dispersion in tricresyl phosphate | 3.0 |
| Tribromoneopentyl alcohol solution, 60% in 3000 mol. wt. propoxylated glycerol | 20.0 |

*80/20 weight ratio of 2,4- and 2,6- tolylene diisocyanate

A 5-foot length of the cured round bun was peeled into a sheet 100 mils thick. The resultant foam sheet had a soft, velvety feel, a uniform cell structure, and was substantially nonlustrous due to the absence of cell membranes. Plant-made foam so obtained has a 46-52 pores per linear inch cell count, and an air permeability (by the method of ASTM D 1564-71) of 5.6 cfm. Its density was 1.54 lb per cubic foot. When ignited according to the procedure of ASTM D 1692-74, it burned for only 15.2 seconds after the ignition source was removed.

EXAMPLES 2-4

Laboratory foam samples were made from the following formulations, to compare tribromoneopentyl alcohol with a conventional flame retardant which is commonly used commercially, tris(1,3-dichloropropyl)-phosphate.

| Ingredients | Parts | | |
|---|---|---|---|
| | Ex. 2 | Ex. 3 | Ex. 4 |
| Polyester derived from diethylene glycol, trimethylolpropane, and adipic acid: mol. wt. 2000, hydroxyl no. 52 | 85.0 | 85.0 | 85.0 |
| Propoxylated glycerol: mol. wt. 3500, hydroxyl no. 48 | 7.0 | 5.0 | 15.0 |
| Tolylene diisocyanate (80/20) | 49.4 | 49.4 | 49.4 |
| Ethoxypropoxylated polysiloxane | 3.5 | 3.5 | 3.5 |
| Poly(dimethylsiloxane)(viscosity 50cs) | 0.6 | 0.6 | 0.6 |
| Water | 3.5 | 3.5 | 3.5 |
| Stannous octoate solution, 50% in tricresyl phosphate | 0.2 | 0.2 | 0.2 |
| N-ethylmorpholine | 0.1 | 0.1 | 0.1 |
| Triethylenediamine solution, 33% in dipropylene glycol | 0.25 | 0.25 | 0.25 |
| Tribromoneopentyl alcohol solution, 60% in 3000 mol. wt. propoxylated glycerol | 20.0 | — | — |
| Tris(1,3-dichloropropyl)phosphate | — | 15.0 | — |

Samples from each foam were tested for flammability by the procedure of ASTM D 1692-74. The extent of horizontal foam burn was 26.8 mm for Example 2, made according to the present invention; and 43.0 mm for the comparative Example 3. The sample from Example 4, a control containing no flame retardant, was entirely consumed.

Fresh samples from each foam were washed thoroughly with several portions of chloroform, and vacuum dried overnight. When the flammability test was repeated on these samples, the extent of horizontal burn was 27.5 mm for the foam of Example 2, while the foams from Examples 3 and 4 were entirely consumed. Although the foam of Example 2 initially contained less flame retardant than that of Example 3, it demonstrated better flame-retardancy; and the flame-retardancy was not lost by extraction with chloroform.

EXAMPLES 5-8

Following the procedure disclosed in U.S. Pat. No. 3,884,848, anti-microbial foams were prepared from the following formulations. In these formulations, tetramethylthiuram disulfide was employed as the antimicrobial agent.

| Ingredients | Parts | | | |
|---|---|---|---|---|
| | Ex. 5 | Ex. 6 | Ex. 7 | Ex. 8 |
| Polyester derived from diethylene glycol, trimethylolpropane, and adipic acid: mol. wt. 2000, hydroxy no. 52 | 90.0 | 90.0 | 90.0 | 90.0 |
| Propoxylated glycerol: mol. wt. 3500, hydroxyl no. 48 | 10.0 | 10.0 | 2.0 | 2.0 |
| Tolylene diisocyanate (80/20) | 45.1 | 45.1 | 45.1 | 45.1 |
| Ethoxypropoxylated polysiloxane | 3.2 | 3.2 | 3.2 | 3.2 |
| Water | 3.6 | 3.6 | 3.6 | 3.6 |
| Stannous octoate, 50% solution in cresyl diphenyl phosphate | 0.45 | 0.45 | 0.45 | 0.45 |
| N-ethylmorpholine | 0.1 | 0.1 | 0.1 | 0.1 |
| Triethylenediamine, 33% solution in dipropylene glycol | 0.4 | 0.4 | 0.4 | 0.4 |
| Carbon black, 12% dispersion in cresyl diphenyl phosphate | 3.0 | 3.0 | 3.0 | 3.0 |
| Tetramethylthiuram disulfide, 45% dispersion in water | 0.4 | 0.4 | 0.4 | 0.4 |
| Stearyl methacrylate | 3.0 | 3.0 | 3.0 | — |
| Butyl oleate | — | — | — | 3.0 |
| Bis(chloromethyl) methylene bis [di(2-chloroethyl)phosphate] | — | 12.0 | — | — |
| Tribromoneopentyl alcohol, 60% solution in 3000 mol. wt. propoxylated glycerol | — | — | 20.0 | 20.0 |

All four foams were highly open and window-free, but that of Example 6 was softer and punky-celled. Samples of all four were ignited according to the conditions of ASTM D 1692-74, before and after gasoline extractions and drying, and the time required for the flame to die after the ignition source was removed is noted below:

| | Ex. 5 | Ex. 6 | Ex. 7 | Ex. 8 |
|---|---|---|---|---|
| Before extraction | sample consumed | 28 secs | 24 secs | 22 secs |
| After extraction | sample consumed | sample consumed | 26 secs | 28 secs |

In addition, fresh samples of foam were subjected to Instron tensile strength determinations, according to the procedure of ASTM D 1564-71, before and after humid heat aging, with results noted below:

| | Ex. 5 | Ex. 6 | Ex. 7 | Ex. 8 |
|---|---|---|---|---|
| Tensile strength before aging, lbs/sq in | 16.1 | 13.8 | 15.3 | 5.1 |
| Tensile strength after humid aging | 16.7 | 6.5 | 14.7 | 14.9 |

All unaged foams showed antimicrobial zones of inhibition, against *E. coli*, of at least 1 mm, essentially all equal.

From the foregoing it will be seen that tribromoneopentyl alcohol gives more nearly permanent flame retardancy than does bis-chloromethyl)methylene bis [di(2-chloroethyl)phosphate], with less damage to the foam during himid aging.

EXAMPLES 9-13

A series of polyether foams was prepared from the following formulations, using laboratory-scale foam-making equipment.

| Ingredients | Parts | | | | |
|---|---|---|---|---|---|
| | Ex. 9 | Ex. 10 | Ex. 11 | Ex. 12 | Ex. 13 |
| Propoxylated glycerol, mol. wt. 3500, hydroxyl no. 48 | 100.0 | 100.0 | 92.0 | 92.0 | 100.0 |
| Tolylene diisocyanate (80/20) (Index) | 53.1 (105) | 53.1 (105) | 53.1 (105) | 53.1 (105) | 48.2 (106) |
| Water | 4.0 | 4.0 | 4.0 | 4.0 | 3.8 |
| Ethoxypropoxylated polysiloxane | 0.4 | 0.4 | 0.6 | 0.6 | 1.5 |
| NIAX catalyst A-1 (sold by Union Carbide Corp.) | 0.15 | 0.15 | 0.15 | 0.15 | — |
| Triethylenediamine, 33% solution in dipropylene glycol | — | — | — | — | 0.3 |
| N-ethylmorpholine | — | — | — | — | 0.05 |
| Stannous octoate, 50% solution in cresyl diphenyl phosphate | 0.12 | 0.12 | 0.12 | 0.12 | 0.45 |
| Octadecyl methacrylate | — | 3.0 | — | 3.0 | 3.0 |
| Tribromoneopentyl alcohol, 60% solution in 3000 mol. wt. propoxylated glycerol | — | — | 20.0 | 20.0 | — |
| Tris(1,3-dichloropropyl) phosphate | — | — | — | — | 30.0 |

Of these five foams, Example 11 had the slowest cream and rise times, a disadvantage in commercial manufacture. Examples 9 and 10 exhibited no flame retardancy. The cell structures of Examples 10, 12, and 13 were more uniform and attractive in appearance than the others. Other properties were:

|  | Ex. 9 | Ex. 10 | Ex. 11 | Ex. 12 | Ex. 13 |
|---|---|---|---|---|---|
| Air Permeability, cfm | 1.0 | 7.1 | 0.5 | 6.8 | 6.1 |
| Tensile Strength, lb/sq in | 15.6 | 14.3 | 12.5 | 13.9 | 11.2 |
| Seconds Burned | consumed | consumed | 22 | 25 | 24 |
| Seconds Burned after extraction with gasoline | consumed | consumed | 31 | 28 | consumed |

From the ease of preparation, cell structure, and foam properties, there appears to be synergism between the cell opener (octadecyl methacrylate) and tribromoneopentyl alcohol, the flame retardant which is the subject os this invention.

EXAMPLES 14 and 15

Example 14 is a commercially available, highly reticulated, flame-retardant polyester polyurethane foam, sold for use as a filter. By means of chemical analysis, this foam was found to contain 4% by weight of tris(2,3-dibromopropyl)phosphate, a conventional flame retardant. It is apparent that the flame retardant was applied to a pre-formed foam as the third step in the manufacturing sequence: foam-making, explosion reticulation, and application of flame retardant, because tris(2,3-dibromopropyl)phosphate is known to be too heat-sensitive to withstand thermal reticulation without decomposing.

Example 15 is a foam made according to the present invention, using the procedure and formulation of Example 1.

The following properties and results were determined:

|  | Ex. 14 | Ex. 15 |
|---|---|---|
| Density, lb per cubic ft | 1.8 | 1.7 |
| Air permeability, cfm | 6.8 | 6.6 |
| Seconds Burned | 43 | 21 |
| Fumes During Burning | Much smoke | Some smoke |
| Seconds Burned after Solvent Extraction | 229 | 23 |
| Seconds Burned after Humid Aging | 186 | 31 |
| Seconds Burned after Dry Heat Aging | 87 | 28 |

It is thus apparent that the foam of Example 15 was superior in flame retardancy, initially, and particularly after extraction and aging.

EXAMPLES 16-19

Example 16 is a commercially available, flame-retardant grade of polyester polyurethane foam, sold for use in acoustic work and recommended for the permanence of its flame retardancy. By means of chemical analysis, this foam was found to contain about 15% by weight of ammonium polyphosphate of the type disclosed in U.S. Pat. No. 3,423,343.

Examples 17-19 are foams prepared from the following formulations, using laboratory foam-making equipment.

|  | Parts | | |
|---|---|---|---|
| Ingredeients | Ex. 17 | Ex. 18 | Ex. 19 |
| Polyester derived from diethylene glycol, trimethylolpropane, and adipic acid: mol. wt. 2000, hydroxyl no. 52 | 100.0 | 100.0 | 80.0 |
| Propoxylated glycerol: mol. wt. 3500, hydroxyl no. 48 | — | — | 12.0 |
| Tolylene diisocyanate (80/20) | 40.0 | 40.0 | 47.5 |
| (Index) | (108) | (108) | (105) |
| N-ethylmorpholine solution in dipropylene glycol | 300 | 3.0 | — |
| Polyester-type polysiloxane surfactant (L-532, sold by Union Carbide Corp.) | 1.0 | 1.0 | — |
| Ethoxypropoxylated polysiloxane (DC-192, sold by Dow Corning Corp.) | — | — | 3.2 |
| Poly(dimethylsiloxane), viscosity 50 cs at 25° C | — | 0.5 | 0.5 |
| Water | 3.0 | 3.0 | 3.5 |
| VERSAMID 140 (mixture of condensation products of aliphatic polyamines and polymerized unsaturated fatty acids) | 3.0 | 3.0 | — |
| Ammonium polyphosphate | 17.0 | 17.0 | — |
| Tribromoneopentyl alcohol, 60% solution in 3000 mol. wt. propxylated glycerol | — | — | 20.0 |

Example 17 was made according to the disclosures of British Pat. No. 1,324,786 (Example $F_3$), and is believed to be essentially identical to the commercial product, Example 16.

Example 18 is similar to Example 17, but using in addition a known cell opener, polydimethylsiloxane, to make a more highly permeable foam.

Example 19 is a foam made according to the present invention.

The following results were obtained:

|  | Ex. 16 | Ex. 17 | Ex. 18 | Ex. 19 |
|---|---|---|---|---|
| Foam cream time, sec | — | 20 | 25 | 9 |
| Foam rise time, sec | — | 140 | 155 | 90 |
| Foam tack-free time, min | — | 500 | 500 | 120 |
| Foam appearance | Uniform, good cells | Uniform, fair cells | Poor, punky | Uniform, good cells |
| Burn time, as is, sec | 9–10 | 14 | 63 | 27 |
| Burn time, after boiling water extraction | 120 | 120 | 120 | 31 |
| Flame laminatability, to vinyl | no good | no good | no good | good |
| Flame laminatability, to nylon | no good | no good | no good | good |

The above results illustrate the superiority of the foam made according to the present invention in regard to foam preparation (cream, rise, and tack-free time),

What is claimed is:

1. In a process for the in situ preparation of a flexible, nonlustrous, substantially membrane-free polyurethane foam from a reaction mixture comprising one or more polyols selected from the group consisting of polyester polyols and polyether polyols, an organic polyisocyanate, water, a hydrophilic organosilicon foam-stabilizing emulsifier-surfactant designed and adapted for use in the preparation of urethane polymer foam from a polyether polyol and an organic polyisocyanate, and a cell-opener selected from the group consisting of hydrophobic anti-foaming organosilicon compounds, and esters of the formula $(RCOO)_n R'$, R and R' in the preceding formula being alkyl or alkenyl groups having from 1 to 30 carbon atoms, at least one of R and R' having at least 3 carbon atoms and $n$ being an integar from one to three, with the proviso that when $n$ is one at least one of R and R' has at least 8 carbon atoms, the amount of cell opener being from about 0.1 to about 3 parts by weight of hydrophobic anti-foaming organosilicon compound or from about 2 to about 10 parts per weight of ester of the formula $(RCOO)_n R'$ per 100 parts total weight of said polyols, the improvement which comprises including in the reaction mixture a flame-retarding amount of tribromoneopentyl alcohol whereby a permanently flame-retardant open-cell foam is obtained.

2. The process of claim 1 wherein said polyol is a polyester polyol admixed with from about 5 percent to about 35 percent by weight of a polyether polyol based upon the weight of the mixture of polyester polyol and polyether polyol, and wherein said cell-opener is a hydrophobic, anti-foaming, organo-silicon compound.

3. The process of claim 2 wherein said cell-opener is poly (dimethylsiloxane).

4. The process of claim 1 wherein said polyol is a polyether polyol, or a polyester polyol admixed with at least two percent by weight of a polyether based upon the weight of the mixture of polyester polyol and polyether polyol, and wherein said cell-opener is an ester of the formula $(RCOO)_n R'$, R and R' in the preceding formula being alkyl or alkenyl groups having from 1 to 30 carbon atoms, at least one of R and R' having at least 3 carbon atoms, and $n$ being an integer from one to three, with the proviso that when $n$ is one at least one of R and R' has at least eight carbon atoms.

5. The process of claim 4 wherein the cell-opener is stearyl methacrylate.

6. The process of claim 4 wherein the cell-opener is butyl oleate.

7. The process of claim 1 wherein the amount of tribromoneopentyl alcohol is from about 3 to about 30 parts by weight per 100 parts by weight of said polyol.

8. The process of claim 1 wherein the amount of tribromoneopentyl alcohol is from about 10 to about 20 parts by weight per 100 parts by weight of said polyol.

9. The process of claim 1 wherein the reaction mixture also comprises an anti-microbial agent in an amount sufficient to prevent the growth of microorganisms on the polyurethane foam.

10. The process of claim 9 wherein the anti-microbial agent is tetramethylthiuram disulfide.

11. A permanently flame-retardant, nonlustrous, substantially membrane-free, flexible polyurethane foam prepared in situ, which comprises the reaction product of one or more polyols selected from the group consisting of polyester polyols and polyether polyols, an organic polyisocyanate, water, a hydrophilic organo-silicon foam-stabilizing emulsifier-surfactant designed and adapted for use in the preparation of urethane polymer foam from a polyether polyol and an organic polyisocyanate, a cell-opener selected from the group consisting of hydrophobic anti-foaming organosilicon compounds, and esters of the formula $(RCOO)_n R'$, R and R' in the preceding formula being alkyl or alkenyl groups having from 1 to 30 carbon atoms, at least one of R and R' having at least 3 carbon atoms and $n$ being an integer from one to three, with the proviso that when $n$ is one at least one of R and R' has at least 8 carbon atoms, the amount of cell opener being from about 0.1 to about 3 parts by weight of hydrophobic anit-foaming organosilicon compound or from about 2 to about 10 parts per weight of ester of the formula $(RCOO)_n R'$ per 100 parts total weight of said polyols, and a flame-retarding amount of tribromoneopentyl alcohol.

12. The permanently flame-retardant substantially membrane-free polyurethane foam of claim 11 which is also anti-microbial, which comprises the reaction product of one or more polyols selected from the group consisting of polyester polyols and polyether polyols, an organic polyisocyanate, water, a hydrophilic organo-silicon foam-stabilizing emulsifier-surfactant designed and adapted for use in the preparation of urethane polymer foam from a polyether polyol and an organic polyisocyanate, a cell-opener selected from the group consisting of hydrophobic anti-foaming organosilicon compounds, and esters of the formula $(RCOO)_n R'$, R and R' in the preceding formula being alkyl or alkenyl groups having from 1 to 30 carbon atoms, at least one of R and R' having at least 3 carbon atoms and $n$ being an integer from one to three, with the proviso that when $n$ is one at least one of R and R' has at least 8 carbon atoms, the amount of cell opener being from 0.1 to about 3 parts by weight of hydrophobic anti-foaming organosilicon compound or from about 2 to about 10 parts per weight of ester of the formula $(RCOO)_n R'$ per 100 parts total weight of said polyols, a flame-retarding amount of tribromoneopentyl alcohol, and an anti-microbial agent.

* * * * *